US010401057B2

(12) United States Patent
Woods

(10) Patent No.: US 10,401,057 B2
(45) Date of Patent: Sep. 3, 2019

(54) INDUCED GROUNDWATER FLOW CLOSED LOOP GEOTHERMAL SYSTEM

(71) Applicant: Woods Technologies, LLC, Coatesville, PA (US)

(72) Inventor: Kevin Woods, Coatesville, PA (US)

(73) Assignee: Woods Technologies, LLC, Coatesville, PA (US)

( * ) Notice: Subject to any disclaimer, the term of this patent is extended or adjusted under 35 U.S.C. 154(b) by 3 days.

(21) Appl. No.: 15/817,804

(22) Filed: Nov. 20, 2017

(65) Prior Publication Data

US 2018/0172318 A1  Jun. 21, 2018

Related U.S. Application Data

(60) Provisional application No. 62/435,375, filed on Dec. 16, 2016.

(51) Int. Cl.
*F24T 10/20* (2018.01)
*F24F 5/00* (2006.01)
(Continued)

(52) U.S. Cl.
CPC .............. *F24T 10/20* (2018.05); *F03G 7/04* (2013.01); *F24D 11/02* (2013.01);
(Continued)

(58) Field of Classification Search
CPC ... F24T 10/20; F24T 2010/50; F24T 2010/53; F03G 7/04; F24D 11/0221; F24D 11/02;
(Continued)

(56) References Cited

U.S. PATENT DOCUMENTS 4,325,681 A * 4/1982 Matthews ................. F03G 7/04
 417/379
7,251,938 B1 * 8/2007 Bond ....................... F03G 7/04
 60/641.2

(Continued)

OTHER PUBLICATIONS

Kevin David Woods, "Advanced Concepts in Ground Thermal Energy Storage Systems," Dissertation, Feb. 2012, pp. 129-169, Department of Mechanical Engineering, College of Engineering, Villanova University, Villanova, United States.

*Primary Examiner* — Hoang M Nguyen
(74) *Attorney, Agent, or Firm* — Ryder, Mazzeo & Konieczny LLC

(57) ABSTRACT

An induced groundwater flow closed loop geothermal system provides safety associated with closed loop geothermal systems (e.g., no mixing of surface water, closed system fluid, and groundwater) and efficiency associated with open loop geothermal systems (e.g., increased heat transfer provided by groundwater flow). A heat exchanger connected to an external system is located in a hole in a geological formation. The hole has a depth below where groundwater is located. A fluid from the external system is routed through the heat exchanger. A pump is utilized to induce groundwater flow from the geological formation, across the heat exchanger and back to the geological formation to enable thermal transfer between the fluid and the groundwater and the groundwater and the geological formation. A casing may be located in the hole to provide structural support and grouting materials may be used to fill space around the casing enabling a groundwater flow path.

20 Claims, 9 Drawing Sheets

(51) Int. Cl.
*F03G 7/04* (2006.01)
*F24D 11/02* (2006.01)
*F25B 27/00* (2006.01)
*F25B 30/00* (2006.01)
F24T 10/00 (2018.01)
F25B 30/06 (2006.01)

(52) U.S. Cl.
CPC .......... *F24D 11/0221* (2013.01); *F24F 5/005* (2013.01); *F25B 27/002* (2013.01); *F25B 30/00* (2013.01); *F24D 2200/11* (2013.01); *F24D 2200/12* (2013.01); *F24F 2005/0057* (2013.01); *F24T 2010/50* (2018.05); *F24T 2010/53* (2018.05); *F25B 30/06* (2013.01); *Y02B 10/20* (2013.01); *Y02B 10/40* (2013.01); *Y02B 10/70* (2013.01); *Y02E 10/10* (2013.01); *Y02E 10/12* (2013.01); *Y02E 10/14* (2013.01); *Y02E 10/16* (2013.01); *Y02E 10/18* (2013.01)

(58) Field of Classification Search
CPC ............. F24D 2200/12; F24D 2200/11; F25B 27/002; F25B 30/00; F25B 30/06; Y02E 10/16; Y02E 10/12; Y02E 10/18; Y02E 10/10; Y02E 10/14; F24F 5/005; F24F 2005/0057; Y02B 10/70; Y02B 10/20; Y02B 10/40
USPC .............................................. 60/641.2–641.4
See application file for complete search history.

(56) References Cited

U.S. PATENT DOCUMENTS

| | | | | |
|---|---|---|---|---|
| 7,490,657 | B2* | 2/2009 | Ueyama | F25B 30/06 |
| | | | | 165/45 |
| 7,555,897 | B2* | 7/2009 | Alekseevich | F03D 9/007 |
| | | | | 60/398 |
| 9,181,931 | B2* | 11/2015 | McBay | F03G 7/04 |
| 2011/0011557 | A1* | 1/2011 | Shelton, Jr. | E21B 7/005 |
| | | | | 165/45 |
| 2014/0013744 | A1* | 1/2014 | Burkhardt | B09B 1/002 |
| | | | | 60/641.2 |

* cited by examiner

INDUCED GROUNDWATER FLOW CLOSED LOOP GEOTHERMAL SYSTEM

PRIORITY

This application claims the priority under 35 USC § 119 of Provisional Application 62/435,375 filed on Dec. 16, 2016, entitled "Induced Groundwater Flow Closed Loop Geothermal System" and having Kevin Woods as inventor. Application Ser. No. 62/435,375 is herein incorporated by reference in its entirety.

BACKGROUND

Heat pumps may operate as heaters and/or air conditioners. The heat pumps utilize refrigerant to transfer heat from one location to another depending on the mode they are operating in. When operating as a heater, they transfer heat from outside to an area to be heated. When operating as an air conditioner, they transfer heat from an area to be cooled to outside. The heat pumps operate more efficiently when the outside temperature is closer to the operational temperature of the refrigerant. As the temperature of the atmosphere fluctuates vastly over the seasons the efficiency of the unit is not optimal.

FIG. 1 illustrates a simple cross-sectional view of an example area 100 of earth. The cross-sectional view includes an upper layer 110 that may be, for example, top soil. Under the upper layer 110 is a geological formation 120 that may be, for example, granite, bedrock or sand. Below the water table 130 for the area 100, groundwater fills the cracks and spaces in the geological formation to form aquifers 140. For clarity, the geological formation is the area both above 120 and below 140 the water table 130 and the aquifer 140 is the area below the water table 130.

Geological formations 120, 140 remain at a constant temperature throughout the year due to being insulated from seasonal temperature variations in the atmosphere. In addition, geological formations 120, 140 can store significant amounts of thermal energy. In general, these two properties of geological formations 120, 140 make geothermal systems a prime technology for increasing the efficiency and reducing the cost associated with heating and cooling buildings throughout the seasons. Geothermal systems are typically connected to heat pumps associated with a buildings heating, ventilation and/or air conditioning (HVAC) system so that the geologic formation 120, 140 acts as a heat source or heat sink for the heat pump depending on whether the heat pump is being used for heating or cooling. Geothermal systems may also be connected to heat exchangers to provide direct heating or cooling without the need for a heat pump.

FIG. 2 illustrates an example of a typical closed loop geothermal system 200. The system 200 includes a borehole 210 drilled into the geological formation 120, 140. Tubing 220 is connected to an HVAC system (e.g., heat pump) for a building and is placed down the borehole 210. The tubing 220 circulates fluid from the buildings HVAC system to transfer heat to the geological formation 120, 140 or receive heat from the geological formation 120, 140. A material impermeable to water flow (e.g., clay, bentonite) 230 is pumped around the tubing 220 to prevent surface water from entering the borehole 210 and potentially contaminating the groundwater, to improve thermal conduction, and to mitigate leaks of fluid from the closed loop system 200. The efficiency of the closed loop system 200 is limited to the amount of thermal energy that can be transferred to/from the geologic formation 120, 140 as the fluid from the HVAC system traverses the tubing 220 within the borehole 210. Because the closed loop system 200 segregates the groundwater in the geological formation 120, 140 from fluid (e.g., surface water) entering and exiting the borehole 210 and because they do not deplete the water supply in the geologic formation 120, 140, they are generally allowable by government entities.

FIG. 3 illustrates an example of a typical open loop geothermal system 300. The system 300 includes a borehole 310 drilled into the geological formation 120, 140 and a pump 320 located with the borehole 310 to extract groundwater 360 from the aquifer 140. The pump 320 pumps the groundwater 360 out of the ground via tubing 330 and the groundwater 360 is somehow circulated through a heat exchanger 340 and then discharged back into the geological formation 120, 140. Tubing 350 connects an HVAC system (e.g., heat pump) for a building to the heat exchanger 340 so that fluid from the buildings HVAC system can be circulated through the heat exchanger 340 in order to transfer heat to the groundwater 360 or receive heat from the groundwater 360. The circulation of the groundwater 360 through the heat exchanger 340 generally provides better performance characteristics than the closed loop system 200. However, open loop systems are often not permitted by governmental entities due to the possibility of surface water infiltration, groundwater depletion through discharge into sewers, and contamination of the aquifer 140.

The thermal conductivity of the geologic formation 120, 140 determines the number and depth of the boreholes 210 drilled for adequate heat transfer in a closed loop system 200. The drilling costs of the boreholes 210, 310 are the major capital cost in the closed loop geothermal system 200. Accordingly, there exists a need to circumvent this thermal conductivity limitation to increase the capacity of a borehole 210, and reduce the number and depth of boreholes 210 required for adequate heat transfer. This, in turn, will reduce capital costs and return on investment, leading to higher market acceptance.

SUMMARY

Unlike closed loop systems in the prior art, an induced groundwater flow closed loop geothermal system is not limited by the thermal conductivity of the geological formation. The induced groundwater flow closed loop geothermal system utilizes groundwater flow to reduce the thermal resistance between the working fluid in the closed system and the geological formation. The induced groundwater flow closed loop geothermal system separates a borehole into two sections to induce groundwater flow through the geologic formation from one section to the other. It is this groundwater flow that alleviates the thermal conductivity limitation imposed by traditional closed geothermal systems. The process of operation is not restricted by governmental entities since the geothermal system is closed and maintains separation between the groundwater, closed system fluid, and surface runoff water.

DETAILED DESCRIPTION

The features and advantages of the present invention will become more readily appreciated as the same becomes better understood by reference to the following detailed description when considered in connection with the accompanying drawings.

The current invention is an induced groundwater flow closed loop geothermal system that provides the safety associated with closed loop systems (e.g., no mixing of surface water, closed system fluid, and/or groundwater) and the efficiency associated with open loop systems (e.g., increased heat transfer provided by groundwater).

Figure 4:
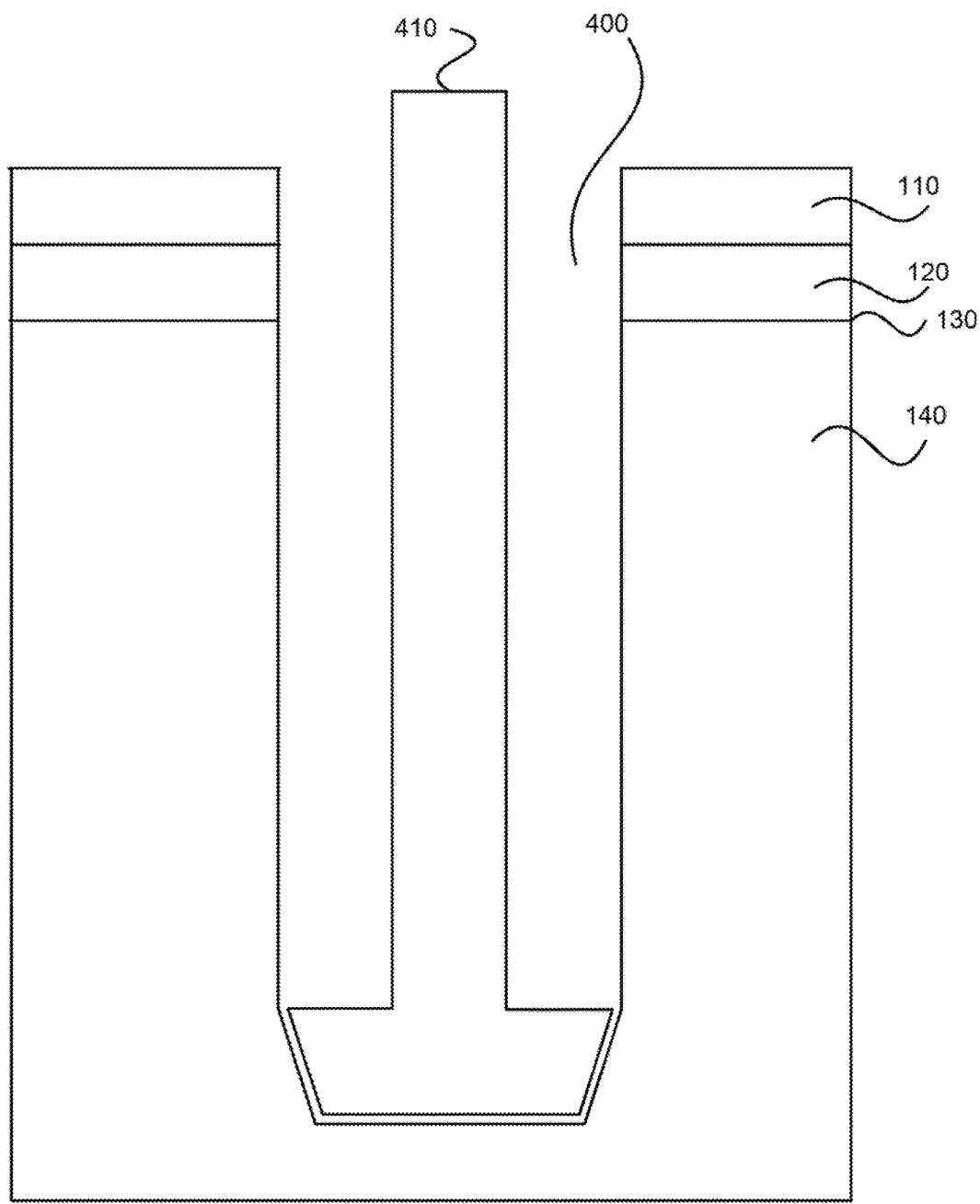
FIG. 4 illustrates a cross-sectional view of an example hole being bored, according to one embodiment.

FIG. 4 illustrates a cross-sectional view of an example hole 400 being bored in the earth using a drill 410. The hole 400 proceeds through the topsoil 110 into the geologic formation 120 and goes deeper than the water table 130 and into the aquifer 140. The depth and diameter of the hole 400 may vary based on several parameters including, but not limited to, amount of heat transfer desired, type of geological formation 120, 140 and depth of the water table 130. After the hole 400 is bored, the drill 410 is removed. It should be noted that the hole 400 need not be formed by boring. Rather, it could be formed by other means, such as blasting, another drilling technique, or it could be a hole that already existed (e.g., was previously created, is a naturally occurring hole).

Figure 5:
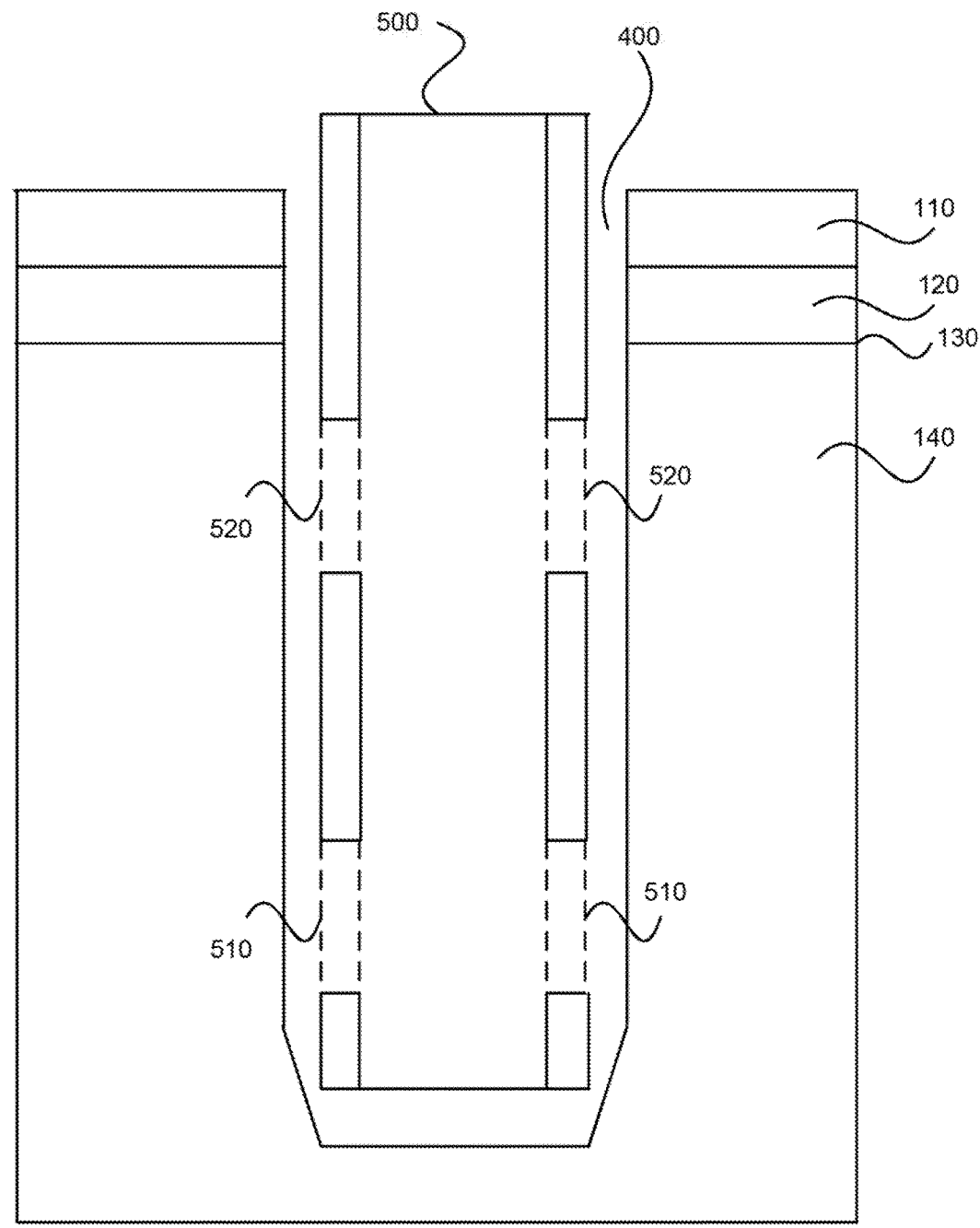
FIG. 5 illustrates a cross-sectional view of an example casing inserted into the hole, according to one embodiment.

FIG. 5 illustrates a cross-sectional view of an example casing 500 installed in the hole 400 to provide structural stability to the hole 400 to prevent the hole 400 from collapsing. The example casing 500 includes a lower permeable (e.g., screened or porous structural compound) section 510 and an upper permeable (e.g., screened or porous structural compound) section 520 that enable flow into and out of the casing 500. The permeable sections 510, 520 are at a depth below the water table level 130 to permit groundwater from the aquifer 140 to flow into and out of the casing 500. The casing 500 may be made out of various materials that provide the structural support to the hole 400 and can withstand being located in the geologic formation 120, 140. Typical casing materials include steel and PVC piping, or a compound (e.g., cement) to ensure structural stability of the hole either in a certain location or throughout the hole 400.

It should be noted that if the geologic formation 120, 140 that the hole 400 is located in is structurally stable (e.g. granite), the casing 500 is not required and may not be utilized. Likewise, if a first portion (e.g., lower, upper) of the hole 400 is located in a geologic formation 120, 140 that is structurally stable and a second portion (e.g., upper, lower) is located in a geologic formation 120, 140 that is structurally unstable (e.g., sand), the casing 500 is only required in the unstable second portion (e.g., upper, lower) of the hole 400 and may not be utilized in the stable first portion (e.g., lower, upper). If the casing 500 is only required and utilized above the water table level 130, then the casing 500 does not require and may not utilize the permeable sections 510, 520 as there is no groundwater at that point. If the casing 500 is utilized for only a portion of the hole 400 below the water table 130 then only one of the permeable sections (e.g., upper permeable section 520, lower permeable section 510) may be required.

Figure 6:
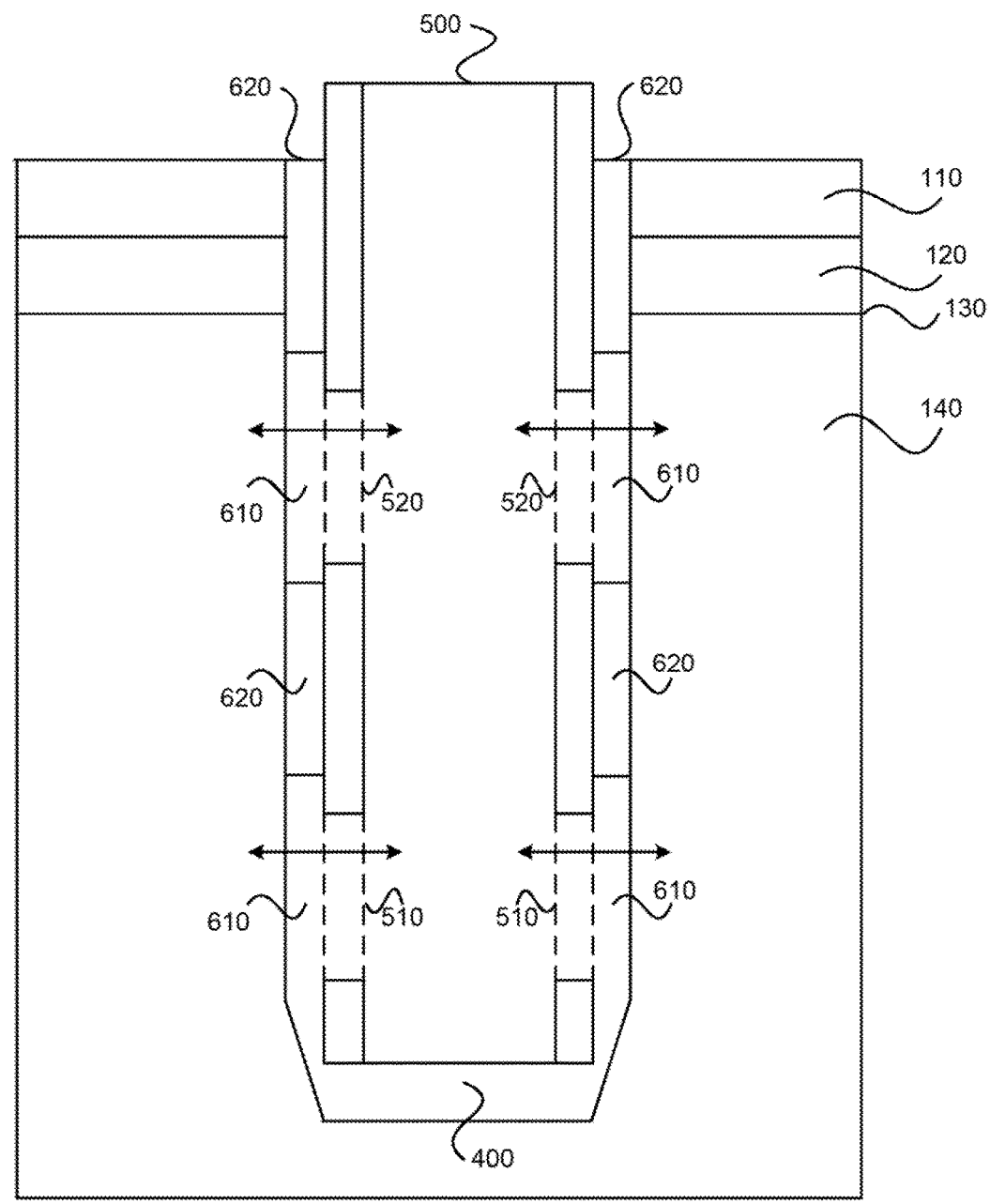
FIG. 6 illustrates a cross-sectional view of permeable and impermeable material located around the casing, according to one embodiment.

FIG. 6 illustrates a cross-sectional view of permeable material 610 and impermeable material 620 (collectively referred to as grouting material) surrounding the casing 500. The permeable material 610 (e.g., gravel) allows the groundwater to flow therethrough while the impermeable material 620 (e.g., clay) does not. The permeable material 610 surrounds the permeable sections 510, 520 and the impermeable material 620 surrounds the other portions. This grouting material surrounding the casing 500 is only necessary for the solid casing pipe and not the casing constructed with a structural compound and is provided for this embodiment to enable induced groundwater flow through the aquifer 140, the hole 400, and installed pumping components.

Initially, the permeable material 610 is pumped around the casing 500 to fill the bottom of the hole 400 and to surround the casing 500 to a level above the lower permeable section 510. The impermeable material 620 is then pumped around the casing 500 on top of the permeable material 610 to a level below the upper permeable section 520. The permeable material 610 is then again pumped around the casing 500 on top of the impermeable material 620 to a level above the upper permeable section 520. Finally, the impermeable material 620 is pumped again around the casing 500 from on top of the permeable material 610 to the surface (even with the top of the topsoil 110).

The impermeable material 620 at the top of the hole 400 impedes surface water infiltration into the groundwater in the aquifer 140 by way of the hole 400. The alternating sections of the permeable material 610 and the impermeable material 620 impede groundwater flow between sections of the hole 400 (e.g., prevent flow between an upper section of the hole 400 aligned with the upper permeable section 520 and a lower section of the hole 400 aligned with the lower permeable section 510) while allowing groundwater to flow into the aquifer 140 across sections of the hole 400 (e.g., allow flow across the upper section of the hole 400 aligned with the upper permeable section 520 and across the lower section of the hole 400 aligned with the lower permeable section 510) and provide, in conjunction with the casing 500, structural stability to the hole 400. The two permeable sections 510, 520 and the aligned permeable material 610 allow the groundwater to flow between the aquifer 140 and the casing 500. Once the groundwater is in the casing 500 it may freely flow therein.

It should be noted, the grouting materials 610, 620 may not be required if the casing 500 was not utilized because the hole 400 is stable (located in a structurally stable geologic formation 120, 140). If the casing 500 does not include the permeable sections 510, 520 the permeable material 610 would not be required.

Figure 7:
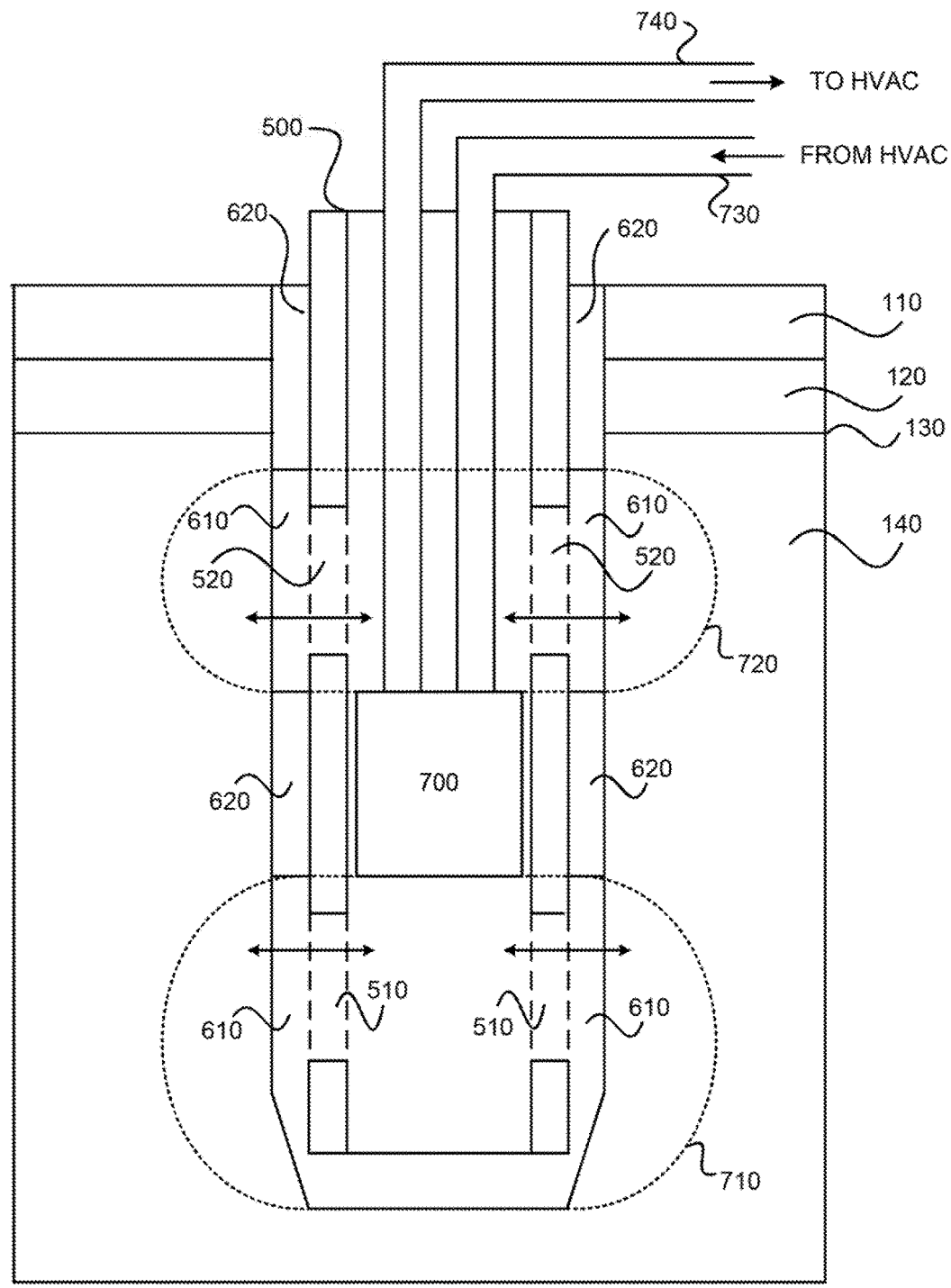
FIG. 7 illustrates a cross-sectional view of an example induced groundwater flow geothermal device installed within the casing, according to one embodiment.

FIG. 7 illustrates a cross-sectional view of an induced groundwater flow geothermal device 700 being placed in the casing 500 between the lower and upper permeable sections 510, 520. The geothermal device 700 will be described in more detail in FIG. 8. Once the geothermal device 700 is placed at the appropriate location it may be engaged to secure the geothermal device in the casing 500. When the geothermal device 700 is secured in place in the casing 500 between the lower and upper permeable sections 510, 520 it seals off a lower section 710 (below the geothermal device 700) of the casing 500 from an upper section 720 (above the geothermal device 700) of the casing 500. The geothermal device 700, when engaged, impedes the natural flow of groundwater between the lower section 710 and the upper section 720 within the casing 500. The groundwater is still free to naturally flow between the aquifer 140 and the lower section 710 and the aquifer 140 and the upper section 720 via the permeable material 610 and the lower permeable section 510 and the upper permeable section 520, respectively. The impermeable material 620 around the casing between the lower permeable section 510 and the upper permeable section 520 impedes the natural flow of groundwater between a lower section of the hole (associated with the lower section 710 of the casing 500) and an upper section of the hole (associated with upper section 720 of the casing 500).

Figure 1:
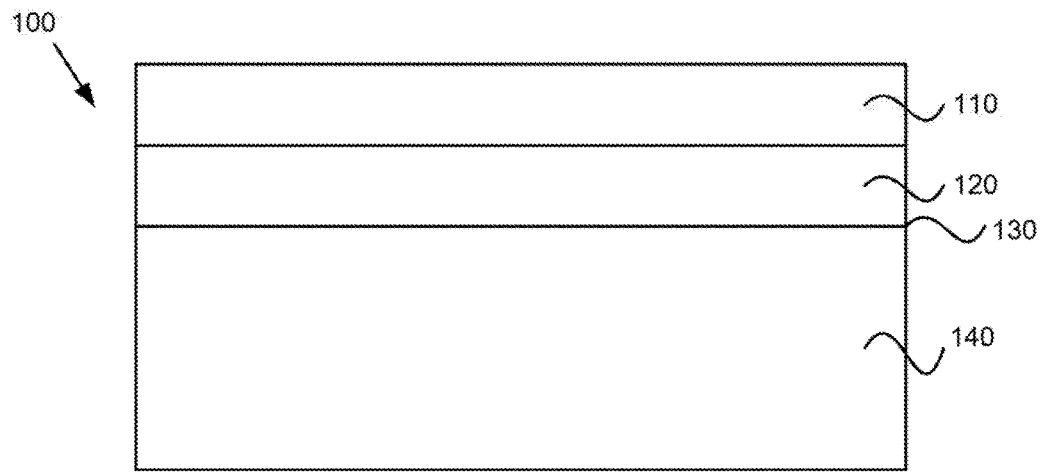
FIG. 1 illustrates a simple cross-sectional view of an example area of earth.
Figure 2:
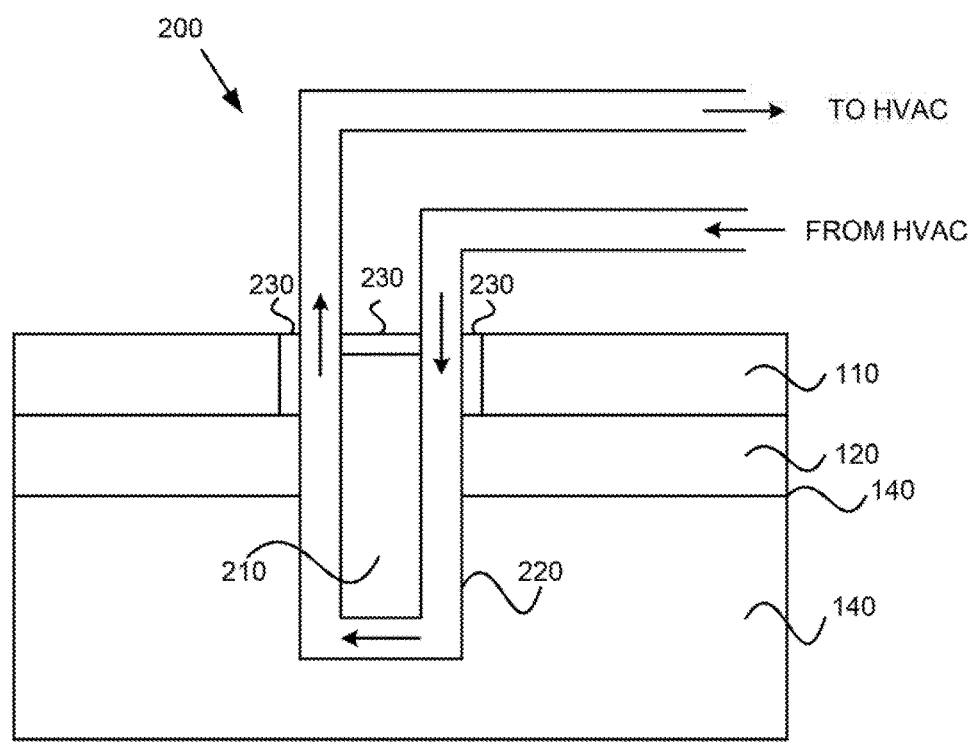
FIG. 2 illustrates an example of a typical closed loop geothermal system.
Figure 3:
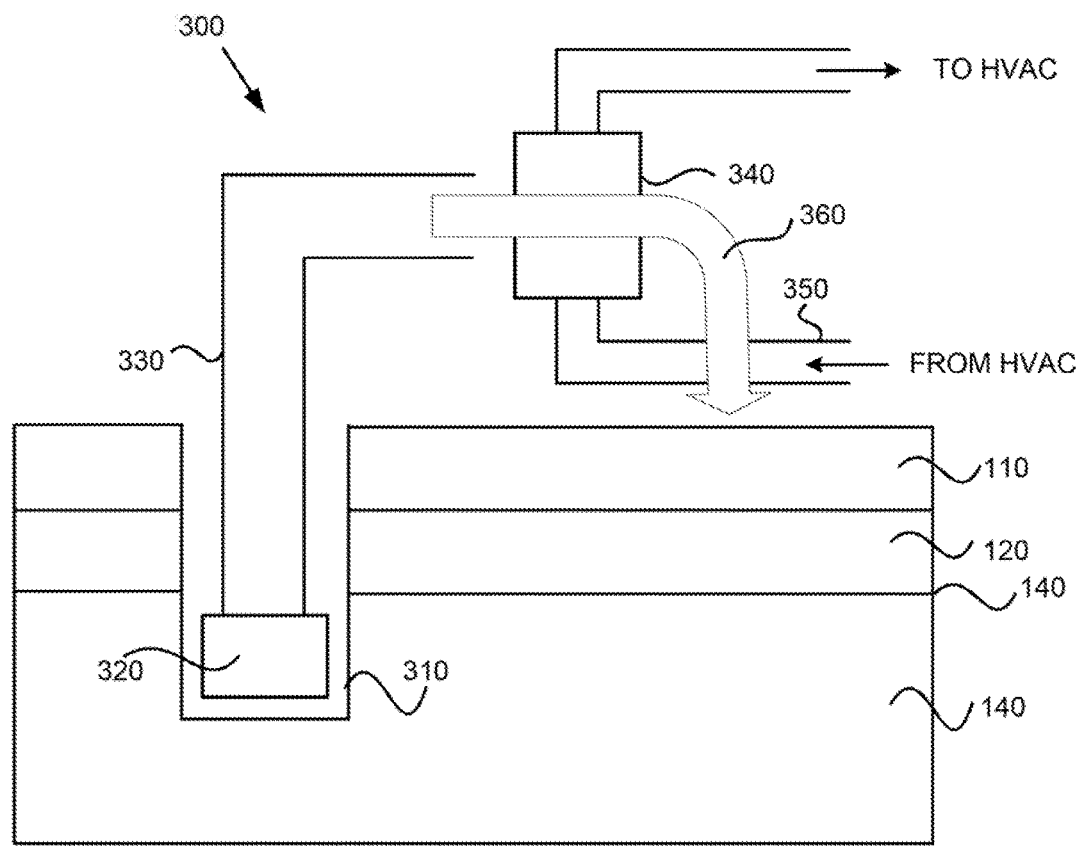
FIG. 3 illustrates an example of a typical open loop geothermal system.

The geothermal device 700 is connected to piping 730 from the HVAC system and piping 740 to the HVAC system. The fluid from the HVAC system is routed via the piping 730, 740 through the geothermal device 700 rather than simply being routed through the borehole 400 as is typical for closed loop systems (such as illustrated in FIG. 2). The closed system fluid being provided by the piping 730, 740 may be either a single phase or two-phase fluid. Single phase fluid remains a liquid or a gas throughout the circulation path of the closed system. Two-phase fluid changes phase between liquid and gas throughout the circulation path of the closed system. The two-phase fluid, in general, enables a higher thermal efficiency for heating and/or cooling.

It should be noted that FIG. 7 is one embodiment where, for example, if the casing 500 was not installed as shown, the geothermal device 700 could be located within the hole 400 and when secured in place in the hole 400 could seal off a lower section 710 of the hole 400 (portion below the geothermal device 700) from an upper section 720 of the hole 400 (portion above the geothermal device 700). The geothermal device 700, when engaged, would impede the natural flow of groundwater between the lower section 710 and the upper section 720 within the hole 400.

Figure 8:
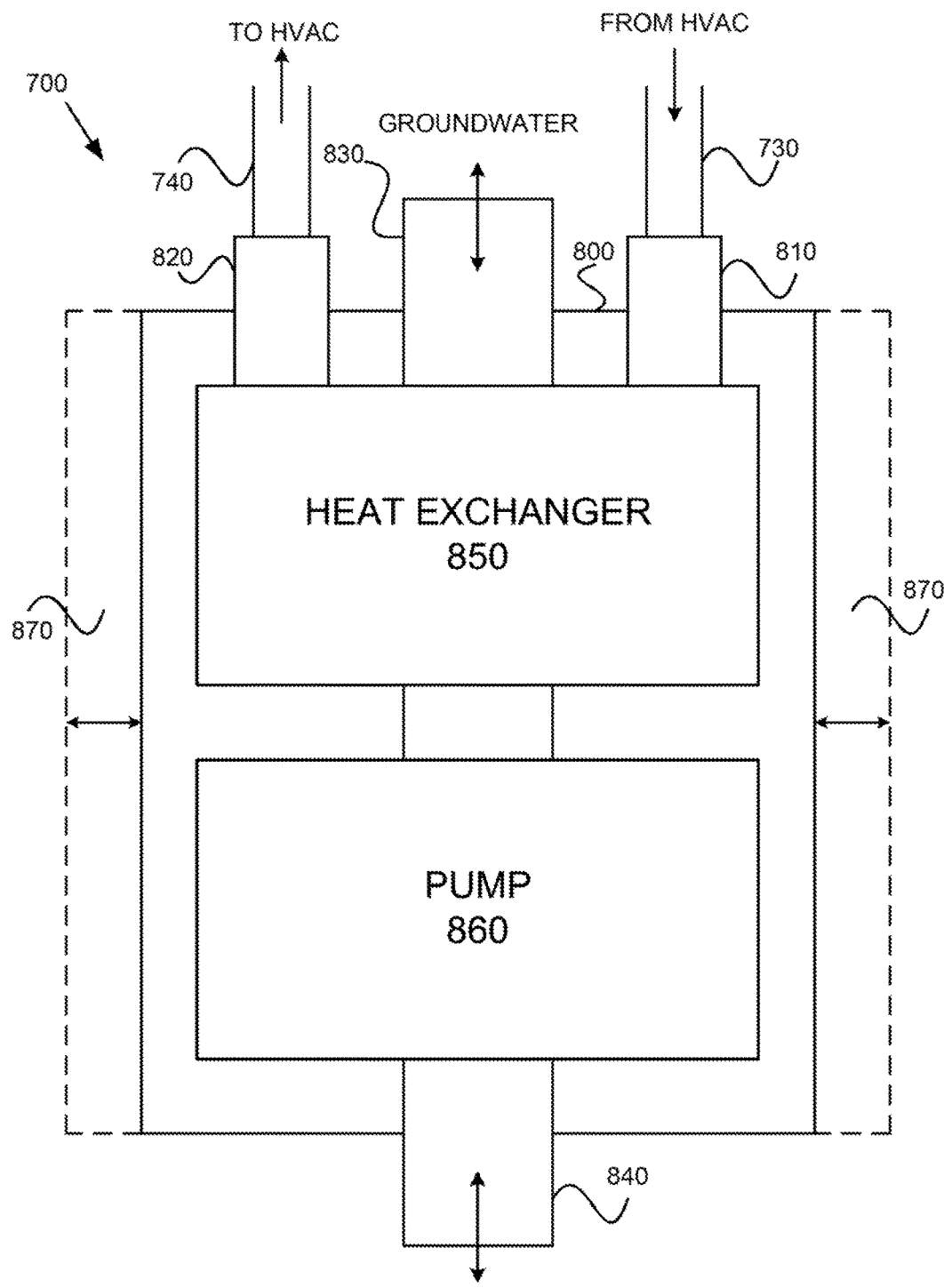
FIG. 8 illustrates a functional diagram of an example induced groundwater flow geothermal device, according to one embodiment.

FIG. 8 illustrates a functional diagram of an example induced groundwater flow geothermal device 700. The geothermal device 700 includes a main body 800 that has ports 810, 820 formed therein for receiving the tubing 730, 740 from the HVAC system. The main body 800 also has an upper port 830 and a lower port 840 formed therein to enable groundwater to pass therethrough when a pump is operating (e.g., pressurized flow). The geothermal device 700 includes a heat exchanger 850 that the closed system fluid is routed through and the groundwater is either routed over, around, by or through (simply referred to as over hereinafter). The heat exchanger 850 keeps the closed system fluid and the groundwater separate so that they are not mixed in any fashion that may result in contamination of the groundwater. The heat exchanger 850 may include the closed system fluid being routed through a serpentine of piping and the groundwater flowing over the piping. As one skilled in the art would recognize various different types of heat exchangers could be utilized.

The geothermal device 700 also includes a pump 860 for assisting in having the groundwater flow through the geothermal device 700 and to provide pressure to force the groundwater to flow through the aquifer 140. The pump 860 may be powered through any one of many methods including, but not limited to electrical power and closed system fluid power (similar to water powered sump pump). The pump 860 may be designed to pull groundwater into the upper port 830 from the upper section 720 of the casing 500 (or the hole 400 if no casing 500 is utilized) and push groundwater from the lower port 840 into the lower section 710 of the casing 500 (or the hole 400). The groundwater pulled from the upper section 720 may enter the casing 500 from the aquifer 140 via the permeable material 610 and the upper permeable section 520 and the groundwater pushed into the lower section 710 may exit the casing 500 to the aquifer 140 via the lower permeable section 510 and the permeable material 610.

Alternatively, the pump 860 may be designed to pull groundwater into the lower port 840 from the lower section 710 of the casing 500 and push groundwater from the upper port 830 into the upper section 720 of the casing 500. The groundwater pulled from the lower section 710 may enter the casing 500 from the aquifer 140 via the permeable material 610 and the lower permeable section 510 and the groundwater pushed into the upper section 720 may exit the casing 500 to the aquifer 140 via the upper permeable section 520 and the permeable material 610. It should be noted that in this embodiment, there is potential for the pumped groundwater to fill the casing 500 and possibly overflow out of the hole 400 if the groundwater doesn't percolate into the aquifer 140 fast enough. Accordingly, the maximum pressure associated with an upward pumping pump is likely lower than the pressure of a downward pumping pump.

It should be noted that the flow through the casing 500, the permeable material 610, and the permeable sections 510, 520 is exemplified by this embodiment and may not occur if the casing 500 and permeable material 610 are not installed as shown.

According to one embodiment, the pump 860 may be capable of pumping in either direction (upward pumping or downward pumping). The direction the pump 860 is operating in may be selected. The selection of the direction may be based on any number of parameters including for example, the operation of the system and the amount of heat transfer required. Reversing the direction of the pump 860 and accordingly the direction of groundwater flow during operation enables recuperation of heat transferred to or from the aquifer 140 via the groundwater, which, in general, increases the thermal efficiency of the closed loop system.

As illustrated in FIG. 8, the pump 860 is located below the heat exchanger 850, but is in no way intended to be limited thereto. For example, the pump 860 could be located above the heat exchanger 850 or the two could be arranged in other configurations as long as the pump 860 is capable of having the groundwater flow over the heat exchanger 850 in order to provide heat exchange between the closed system fluid and the groundwater. The upper port 830 is illustrated as being centered and located between the ports 810, 820 but is in no way intended to be limited thereto. Rather the location of all the ports 810, 820, 830, 840 could vary without departing from the current scope as long as the correct flow and heat transfer is obtained.

The geothermal device 700 includes a sealing mechanism 870 secured to the main body 800. The sealing mechanism 870 is able to be engaged and disengaged. When engaged, a seal is formed between the upper section 720 and the lower section 710 of the casing 500 (or the hole 400), and geothermal device 700 may operate. When disengaged, the geothermal device 700 and the piping 730, 740 are able to be removed from the casing 500 (or the hole 400) for replacement or service. In addition, when the sealing mechanism 870 is disengaged, accumulated particulates that have settled in the upper section 720 may flow to the bottom section 710 alleviating possible flow obstructions within the geothermal device 700. According to one embodiment, the sealing mechanism 870 is an expandable washer. As one skilled in the art would know, various different sealing mechanisms 870 could be used.

An induced groundwater flow closed loop geothermal system provides the safety associated with closed loop systems (e.g., no mixing surface water, closed system fluid, and groundwater) and the efficiency associated with open loop systems (e.g., increased heat transfer provided by groundwater). The induced groundwater flow closed loop geothermal system includes the hole 400, the geothermal device 700 (the heat exchanger 850, the pump 860, and the sealing mechanism 870) and the piping 730, 740 to and from the HVAC system. The system may also include the casing 500 within the hole 400 to provide support for the hole 400 and the casing 500 may include lower and upper permeable sections 510, 520. The casing 500 may be surrounded with permeable and non-permeable materials 610, 620 with the permeable material 610 being aligned with the permeable sections 510, 520 to allow groundwater flow and the non-permeable material 620 at the top of the hole 400 impeding surface water infiltration.

As previously noted, the grouting materials 610, 620 and the casing 500 with permeable sections 510, 520 are installed for structural stability of the hole 400 and may not be necessary for a structurally sound hole 400 (located in a structurally stable geologic formation 120, 140 such as granite).

The geothermal device 700 is secured within the casing 500 between the permeable sections 510, 520 to segregate the casing 500 into the lower and upper sections 710, 720. Without the casing 500, and the grouting materials 610, 620, the geothermal device 700 segregates the hole 400 into lower and upper sections 710, 720. The closed loop fluid from the HVAC system is provided to the geothermal device 700 and the groundwater is routed therethrough so that the heat transfer occurs therebetween.

Figure 9A:
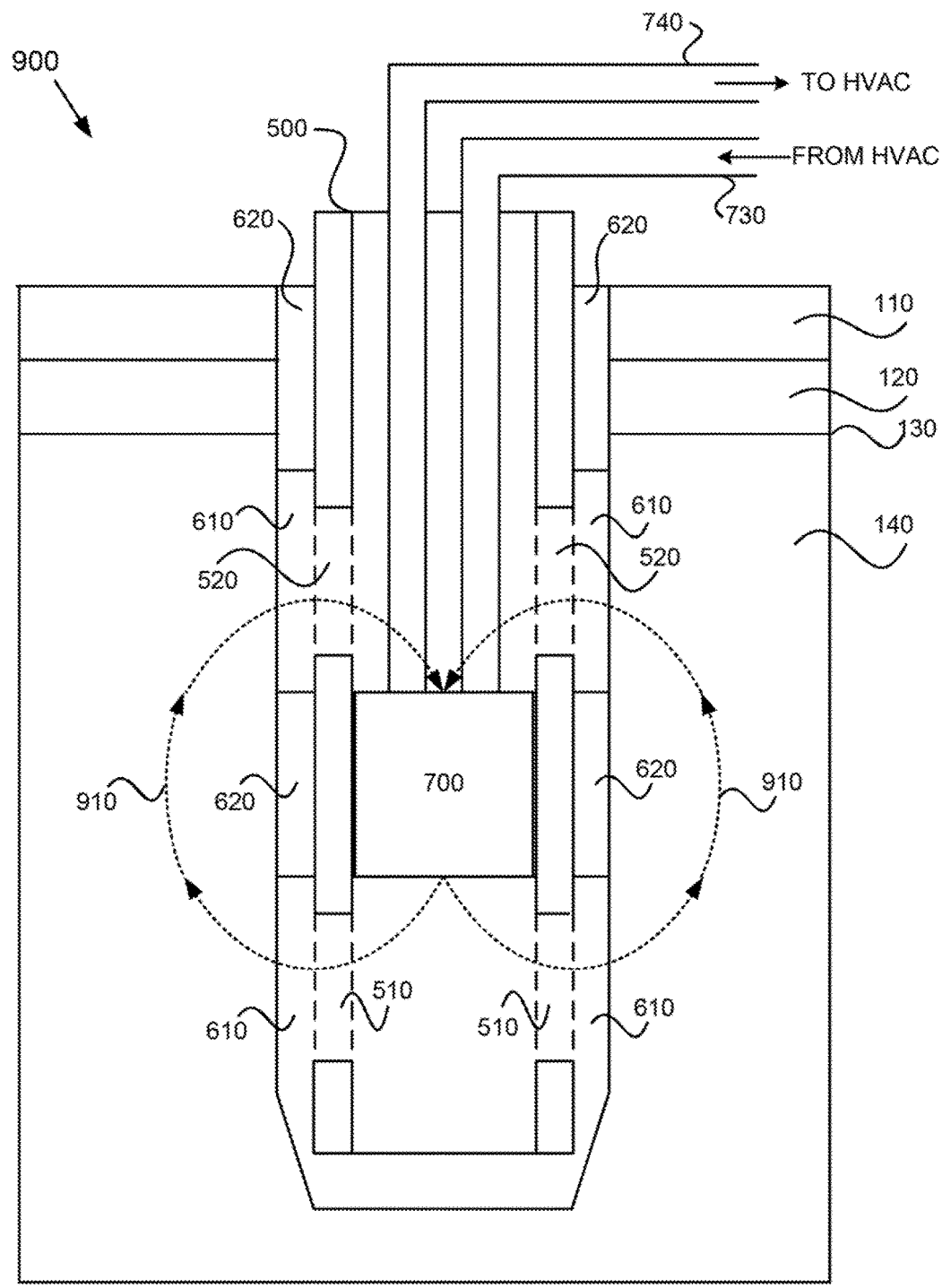
FIG. 9A illustrates a cross-sectional view of an example induced groundwater flow closed loop geothermal system operating in a downward flow, according to one embodiment.

FIG. 9A illustrates a cross sectional view of an example induced groundwater flow closed loop geothermal system 900 operating in a downward flow. The groundwater is pulled through the upper section 720 of the casing 500 through the geothermal device 700 and is extracted in the lower section 710 of the casing 500. When heat is being absorbed by the groundwater (groundwater is acting as a heat sink), the groundwater exiting the geothermal device 700 will be warmer than the groundwater entering the geothermal device 700. When heat is being provided by the groundwater (groundwater is acting as a heat source), the groundwater exiting the geothermal device 700 will be colder than the groundwater entering the geothermal device 700. The groundwater flow from above to below the geothermal device 700 may produce a circulation path 910 of the groundwater.

Figure 9B:
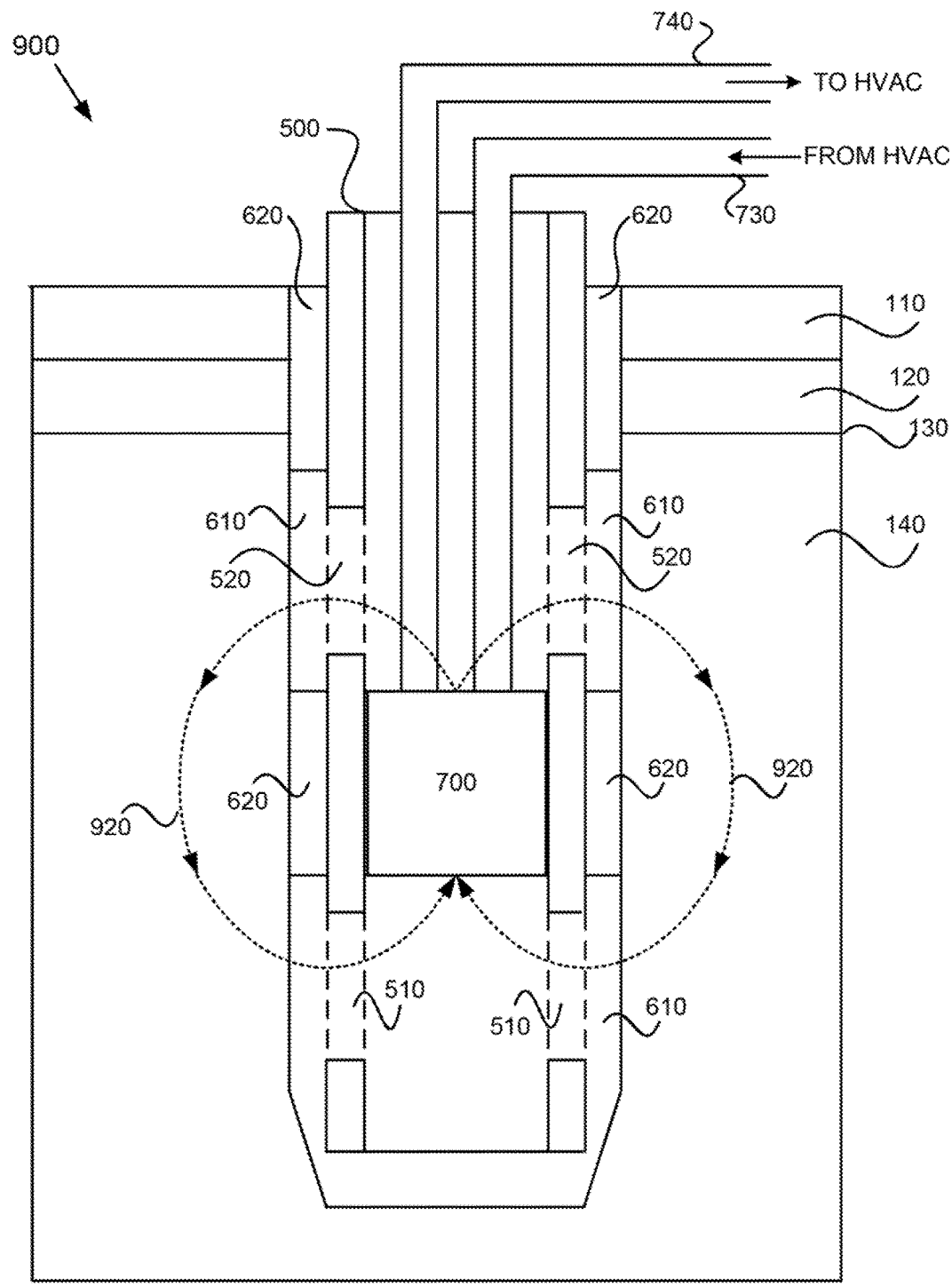
FIG. 9B illustrates a cross-sectional view of the example induced groundwater flow closed loop geothermal system operating in an upward flow, according to one embodiment.

FIG. 9B illustrates a cross sectional view of an example induced groundwater flow closed loop geothermal system 900 operating in an upward flow. The groundwater is pulled through the lower section 710 of the casing 500 through the geothermal device 700 and flows out of the upper section 720 of the casing 500. The groundwater flow from below to above the geothermal device 700 may produce a circulation path 920 of the groundwater.

It should be noted that the hole 400 is illustrated and discussed as traversing the earth vertically but it is not intended to be limited thereto. Rather, the hole 400 could traverse the earth at an angle and in certain instances could traverse the earth horizontally (e.g., side of mountain). Also, the permeable sections 510, 520 are illustrated and discussed as being a single lower section 510 and a single upper section 520 but are not intended to be limited thereto. Rather, each of the sections 510, 520 could include multiple sections. Furthermore, the sections 510, 520 could be organized on the sides of the casing 500 (e.g., left/right, front/back).

The geothermal device 700 has been illustrated and discussed as separating the casing 500 (or the hole 400) into a lower section 710 and an upper section 720 and the pump 860 causing the groundwater to flow from one section to the other over the heat exchanger 850. While this configuration may be the most functional, it is in no way intended to be limited thereto. Rather, the sections could be divided in other ways (e.g., left/right, front/back) without departing from the current scope as long are the sections are sealed from each other and the pump 860 can cause the groundwater to flow from one section to the other over the heat exchanger 850.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed is:

1. An induced groundwater flow closed loop geothermal system, the system comprising:
   an induced groundwater flow geothermal device to be located within a hole that proceeds though a top layer and into a geological formation to a depth below a water table where groundwater is located in the geological formation, the device comprising:
   a sealing mechanism to secure the induced groundwater flow geothermal device in the hole and to seal off a first section of the hole from a second section of the hole;
   a heat exchanger;
   an input port to connect to an external system, wherein the input port is to receive a fluid from the external system and provide the fluid to the heat exchanger;
   an output port to connect to the external system, wherein the output port is to receive the fluid from the heat exchanger and provide the fluid to the external system;
   a groundwater path through the induced groundwater flow geothermal device from a first groundwater port to a second groundwater port over the heat exchanger, wherein flow of the groundwater over the heat exchanger is to enable thermal transfer between the fluid and the groundwater; and a pump to induce the groundwater to flow through the groundwater path.

2. The system of claim 1, wherein the pump pulls the groundwater from the first section of the hole and pushes the groundwater to the second section of the hole.

3. The system of claim 2, wherein the pump further causes the groundwater to flow from the geological formation to the first section of the hole, from the first section of the hole to the induced groundwater flow geothermal device, through the induced groundwater flow geothermal device, from the induced groundwater flow geothermal device to the second section of the hole and from the second section of the hole to the geological formation.

4. The system of claim 2, wherein
the first section of the hole is located above the induced groundwater flow geothermal device; and
the second section of the hole is located below the induced groundwater flow geothermal device.

5. The system of claim 2, wherein
the first section of the hole is located below the induced groundwater flow geothermal device; and
the second section of the hole is located above the induced groundwater flow geothermal device.

6. The system of claim 1, wherein the pump is reversible between a first direction and a second direction, wherein when operating in the first direction the pump pulls the groundwater from the first section of the hole and pushes the groundwater to the second section of the hole and when operating in the second direction the pump pulls the groundwater from the second section of the hole and pushes the groundwater to the first section of the hole.

7. The system of claim 1, further comprising a casing located in the hole to provide structural support for the hole, wherein the induced groundwater flow geothermal device is to be located within the casing.

8. The system of claim 7, wherein the casing has a first permeable section and a second permeable section, wherein the casing is orientated in the hole such that the first permeable section and the second permeable section are below the water table and allow groundwater to flow therethrough, wherein the induced groundwater flow geothermal device is to be located within the casing between the first permeable section and the second permeable section.

9. The system of claim 8, further comprising permeable and non-permeable material in the hole surrounding the casing, wherein the permeable material is aligned with the first permeable section and the second permeable section to allow groundwater to flow therethrough and the impermeable material prevents surface water from entering the hole, and prevents groundwater flow between the first section of the hole and the second section of the hole.

10. The system of claim 1, wherein the fluid from the external system is a single-phase fluid.

11. The system of claim 1, wherein the fluid from the external system is a two-phase fluid.

12. The system of claim 1, wherein the external system is a heat pump.

13. A method for providing an induced groundwater flow closed loop geothermal system, the method comprising:
providing an induced groundwater flow geothermal device in a hole, wherein the hole proceeds though a top layer and into a geological formation to a depth below a water table where groundwater is located in the geological formation, wherein the induced groundwater flow geothermal device is located below the water table, and wherein the induced groundwater flow geothermal device includes a heat exchanger and a pump within a housing, a first and a second groundwater port formed in the housing to create a groundwater pathway therethrough that passes over the heat exchanger, and a seal external to the housing that can be engaged and disengaged;
engaging the seal of the induced groundwater flow geothermal device to secure the induced groundwater flow geothermal device within the hole and seal an upper portion of the hole from a lower portion of the hole such that flow of the groundwater from the upper portion of the hole to the lower portion of the hole or vice versa is via the groundwater pathway; and
connecting piping from an external system to the induced groundwater flow geothermal device to provide a pathway to the heat exchanger for fluid from the external system, wherein the heat exchanger is to enable thermal transfer between the fluid and the groundwater.

14. The method of claim 13, further comprising providing a casing into the hole to provide structural support for the hole, wherein the providing an induced groundwater flow geothermal device includes providing the induced groundwater flow geothermal device in the casing within the hole.

15. The method of claim 13, further comprising providing a casing having a first permeable section and a second permeable section into the hole, wherein the casing is orientated in the hole such that the first permeable section and the second permeable section are below the water table and allow groundwater to flow therethrough, and wherein the providing an induced groundwater flow geothermal device includes providing the induced groundwater flow geothermal device in the casing within the hole between the first permeable section and the second permeable section such that the flow of groundwater over the heat exchanger is into the upper portion of the hole via the first permeable section, from the upper portion of the hole to the lower portion of the hole via the groundwater pathway, and out of the lower portion of the hole via the second permeable section or vice versa.

16. The method of claim 15, further comprising
providing a permeable material around the casing from a bottom of the borehole to above the first permeable section to create a lower permeable layer;
providing an impermeable material around the casing from the top of the lower permeable layer to below the second permeable section to create a lower impermeable layer;
providing the permeable material around the casing from a top of the lower impermeable layer to above the second permeable section to create an upper permeable layer; and
providing the impermeable material around the casing from the top of the upper permeable layer to surface level to create an upper impermeable layer that prevents surface water from entering the borehole.

17. The method of claim 13, further comprising drilling the hole.

18. The method of claim 13, further comprising
circulating the fluid from the external system through the heat exchanger; and
operating the pump to induce groundwater flow through the groundwater pathway over the heat exchanger to enable thermal transfer between the fluid and the groundwater.

19. A method for heat transfer between an HVAC system and groundwater in a closed loop system, the method comprising
  locating an induced groundwater flow geothermal device within a hole that proceeds through a top layer and into a geological formation to a depth below a water table where groundwater is located in the geological formation, wherein the induced groundwater flow geothermal device includes a heat exchanger and a pump within a housing, a first and a second groundwater port formed in the housing to create a groundwater pathway that passes over the heat exchanger, and a seal external to the housing that can be engaged and disengaged;
  engaging the seal to seal a first section of the hole from a second section of the hole such that flow of the groundwater from the first section of the hole to the second section of the hole is via the groundwater pathway;
  circulating a fluid from the HVAC system through the heat exchanger; and
  operating the pump to induce groundwater flow from the first section of the hole to the second section of the hole over the heat exchanger to enable thermal transfer between the fluid and the groundwater.

20. The method of claim 19, wherein
the pump causes the groundwater to flow from the geological formation to the first section of the hole, from the first section of the hole to the induced groundwater flow geothermal device, through the induced groundwater flow geothermal device and over the heat exchanger, from the induced groundwater flow geothermal device to the second section of the hole, and from the second section of the hole to the geological formation.

* * * * *